United States Patent [19]

Hetebrij et al.

[11] 4,056,781

[45] Nov. 1, 1977

[54] DEVICE FOR CALLING A GROUND STATION BY AN AIRCRAFT

[75] Inventors: Albert Hetebrij; Cornelis Adrianus Geertrudis Kloeck, both of Bussum, Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 724,922

[22] Filed: Sept. 20, 1976

Related U.S. Application Data

[63] Continuation-in-part of Ser. No. 502,170, Aug. 30, 1974, abandoned.

[51] Int. Cl.² .......................... H04B 1/00; H04B 3/60
[52] U.S. Cl. .............................. 325/55; 343/100 CS
[58] Field of Search ................. 325/55, 64; 340/25, 340/26, 27 NA; 343/100 AD, 100 CS, 502, 170

[56] References Cited

U.S. PATENT DOCUMENTS

| 3,859,475 | 1/1975 | Wulfsberg et al. | 325/55 |
| 4,007,422 | 2/1977 | da Silva | 325/55 |

*Primary Examiner*—Robert L. Griffin
*Assistant Examiner*—Marc E. Bookbinder
*Attorney, Agent, or Firm*—Hugh A. Kirk

[57] ABSTRACT

A ground station system for automatically monitoring a predetermined plurality of carrier frequencies for radio communication calls from aircraft which transmit and receive traffic over one of said carrier frequencies, wherein the aircraft transmits a calling code signal for a selected ground station, and each of the ground stations has a separate receiver for each of said carrier frequencies. Each receiver is connected to a decoding device which detects only complete and correct calling code signals for that particular ground station. In addition to each of the calling code signals having a first calling part for the pre-selected ground station, each calling code signal also may have a second or an information part indicating the direction sector of the aircraft with respect to the called ground station, the way of modulation or modulation scheme, e.g. A-M or S.S.B., and the company or party being called at that station. If the calling code contains the second or information part, the decoding device not only detects complete and correct code signals of the second part, but also automatically connects that transmitter at the ground station which transmits on the same carrier frequency and in the requested mode, as well as automatically switches the directional antennas for both the receiver and transmitter of that carrier frequency toward the sector in which the transmitting or calling aircraft is located. Once the complete and correct calling signal has been received, its receiver at that ground station is blocked from receiving further calls until the information in the calling signal has been processed and the called party connected, and further until the called party disconnects it.

13 Claims, 9 Drawing Figures

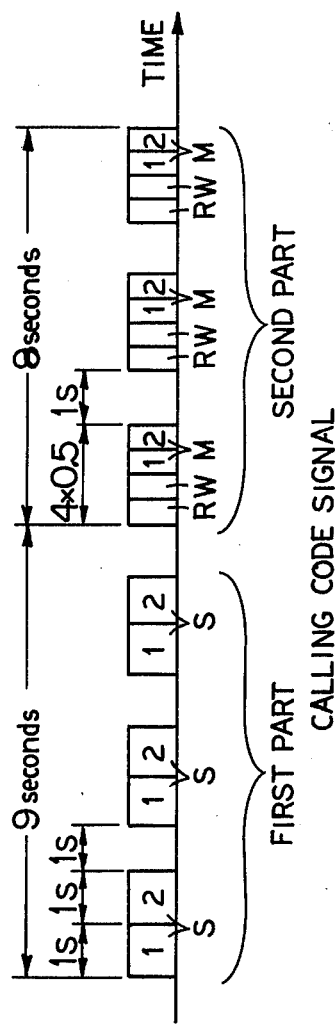
FIG. I
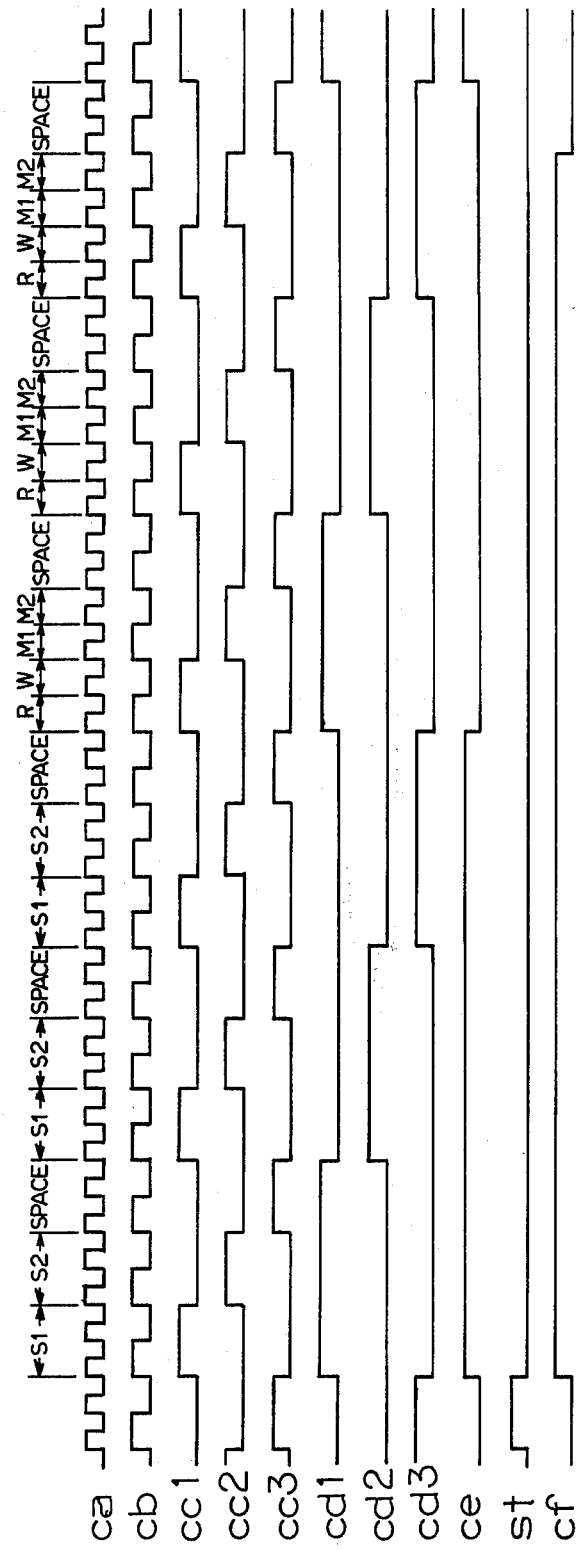
FIG. III

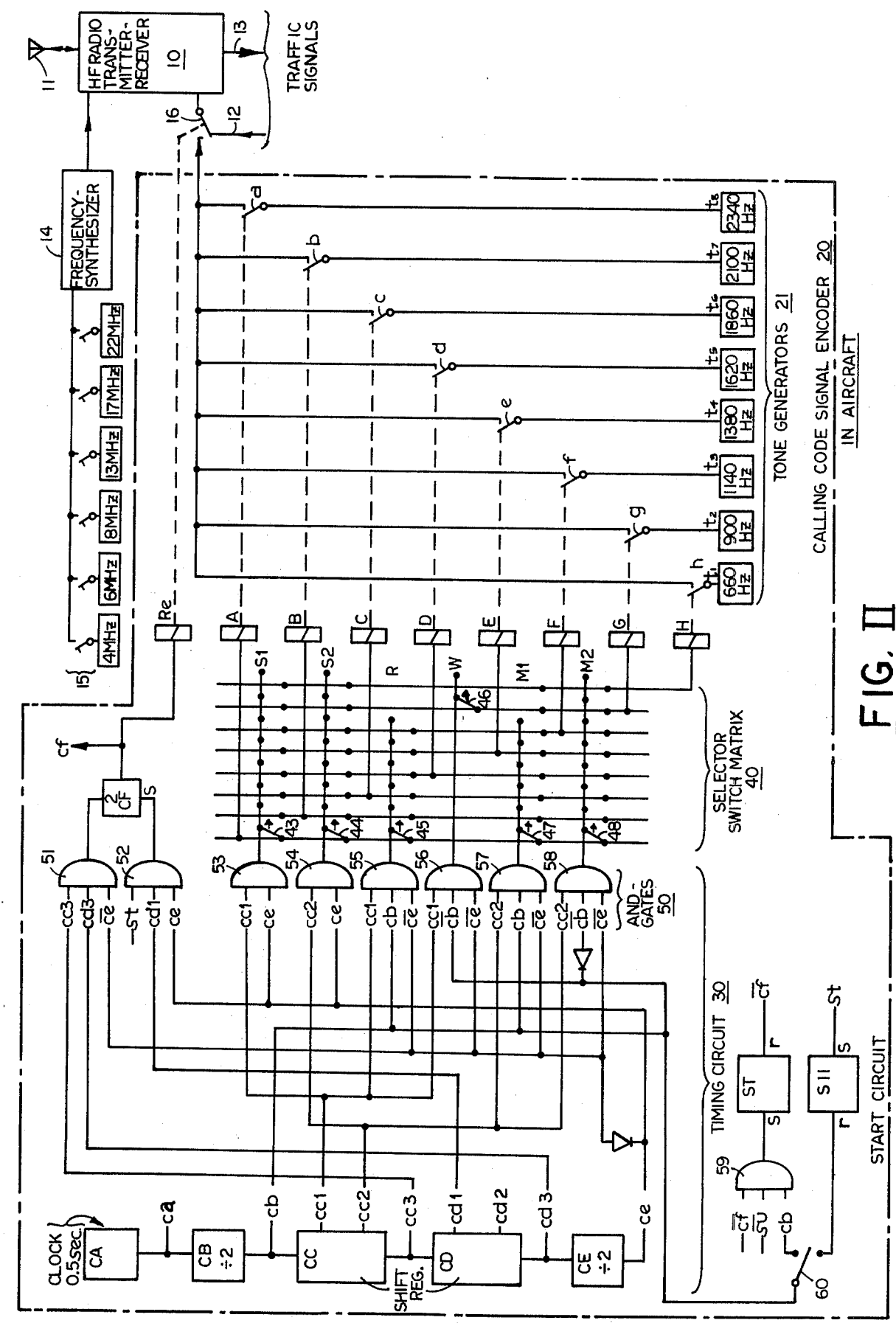
FIG. II

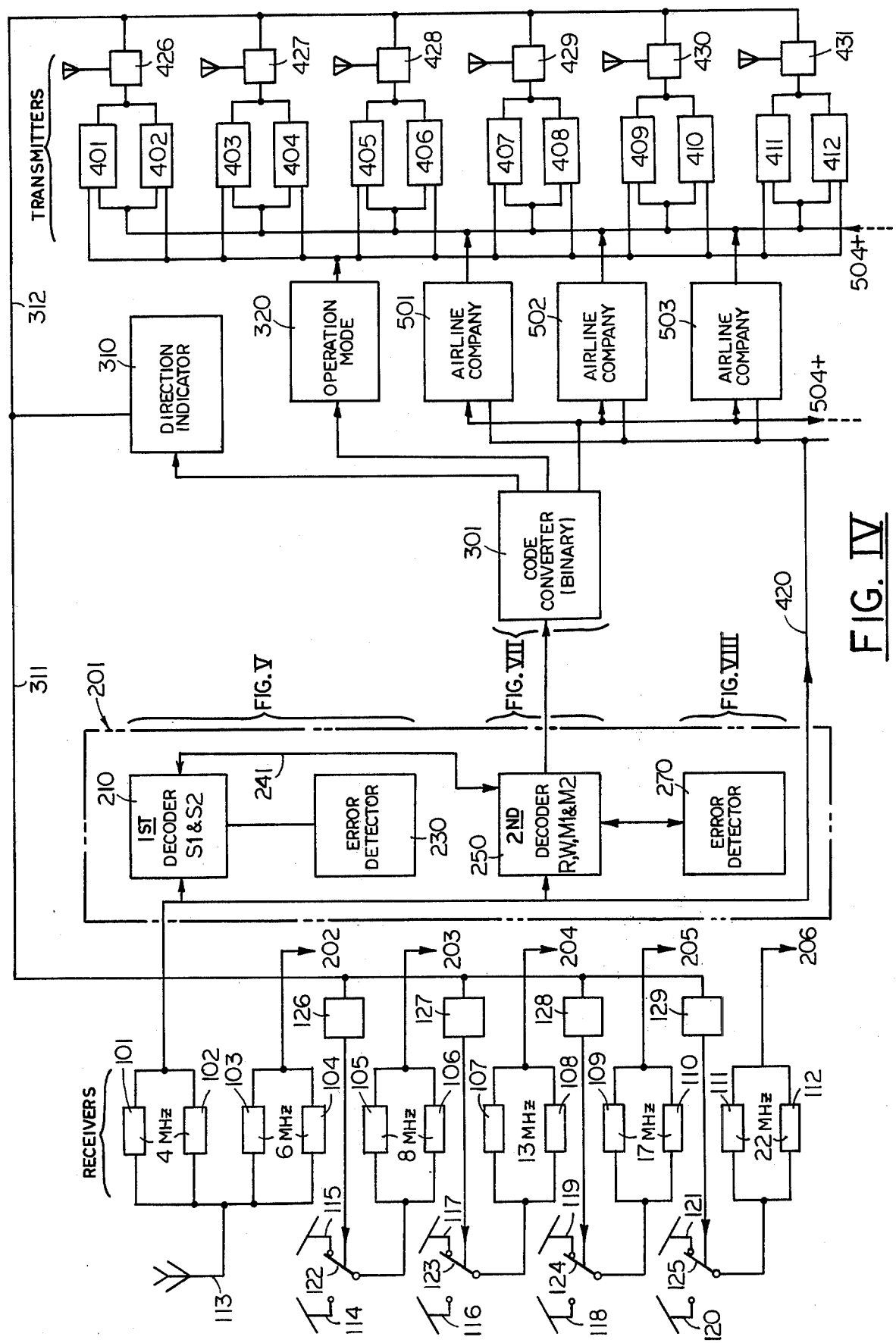
FIG. IV

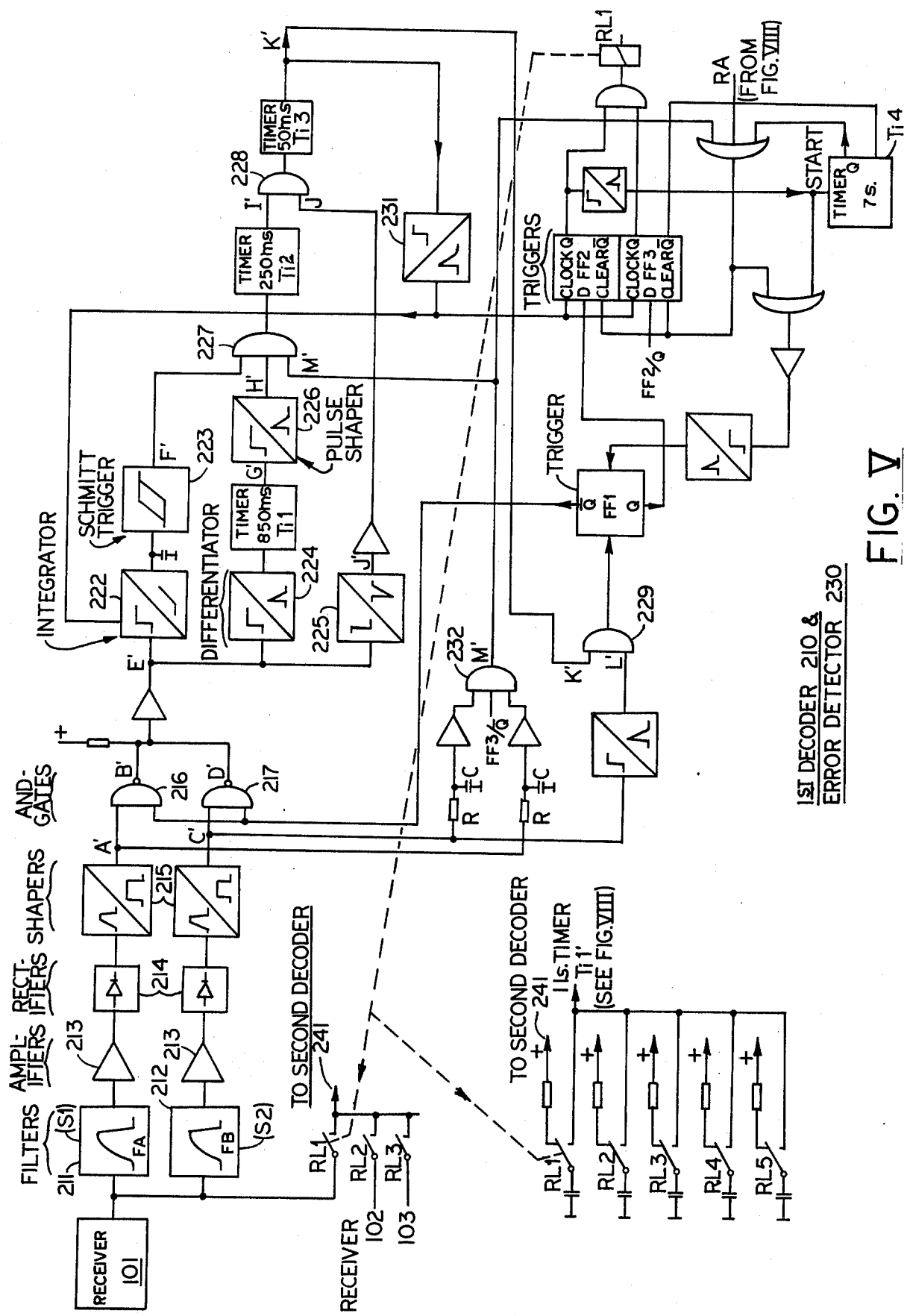
FIG. V

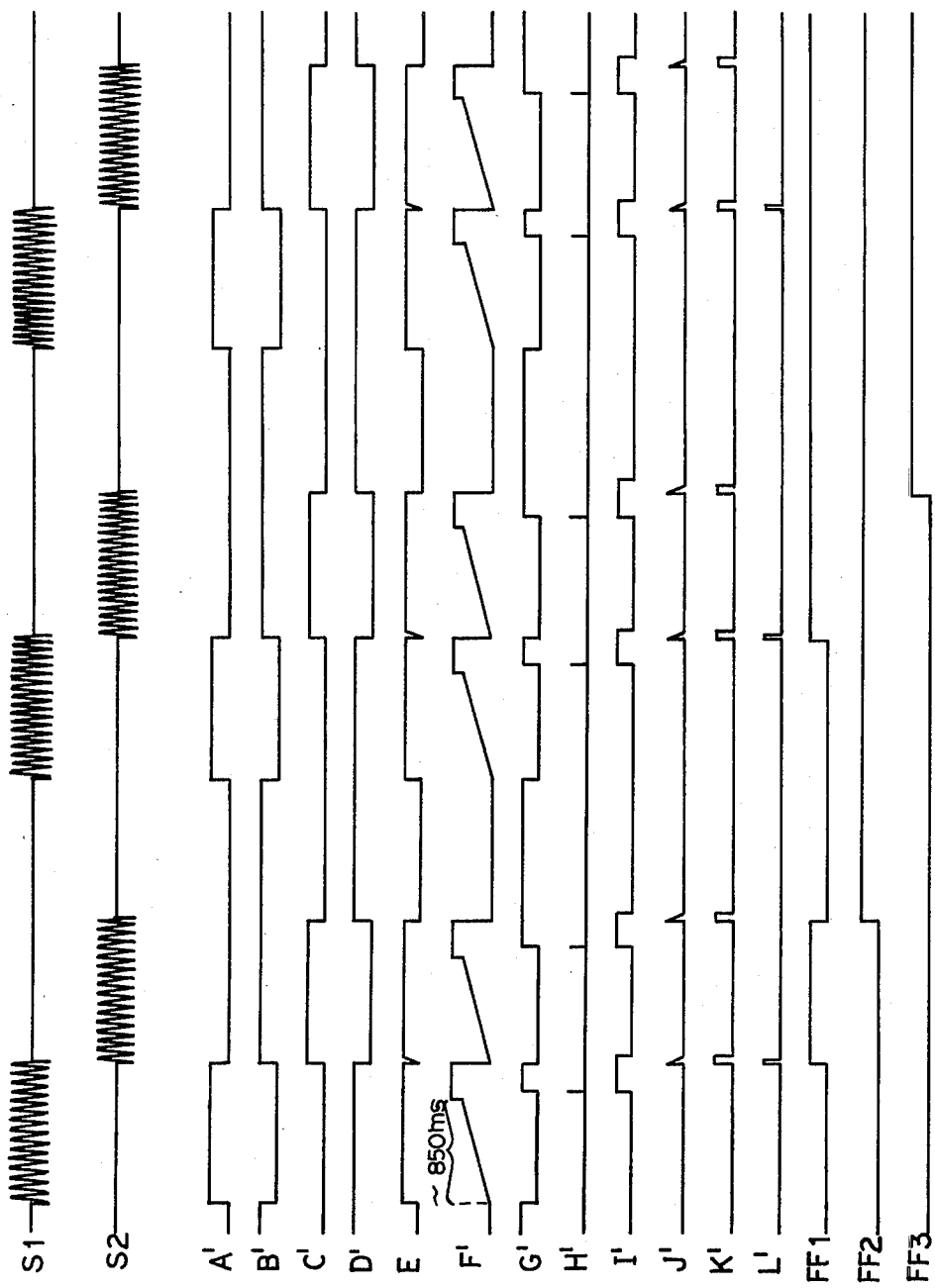
FIG. VI

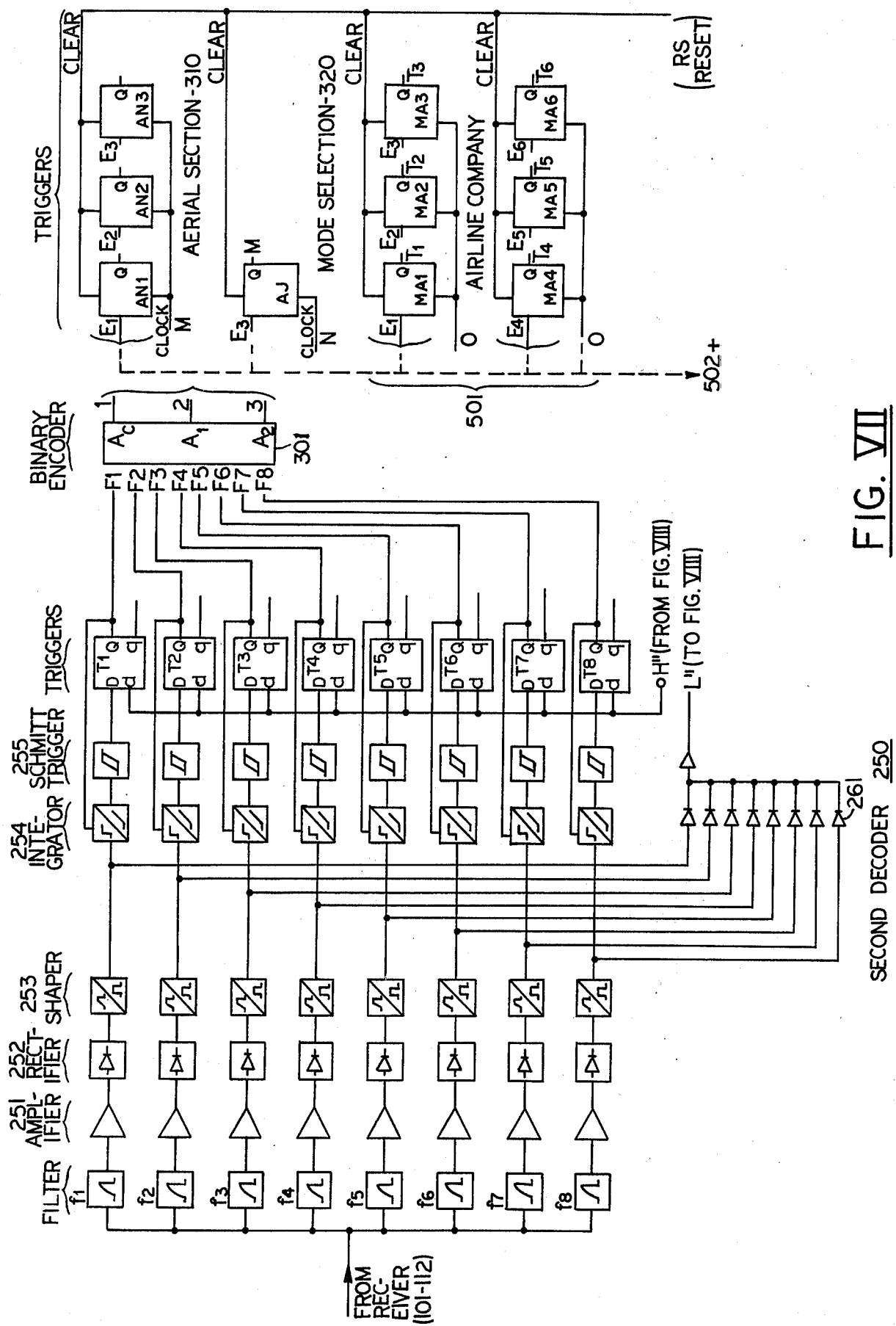
FIG. VII

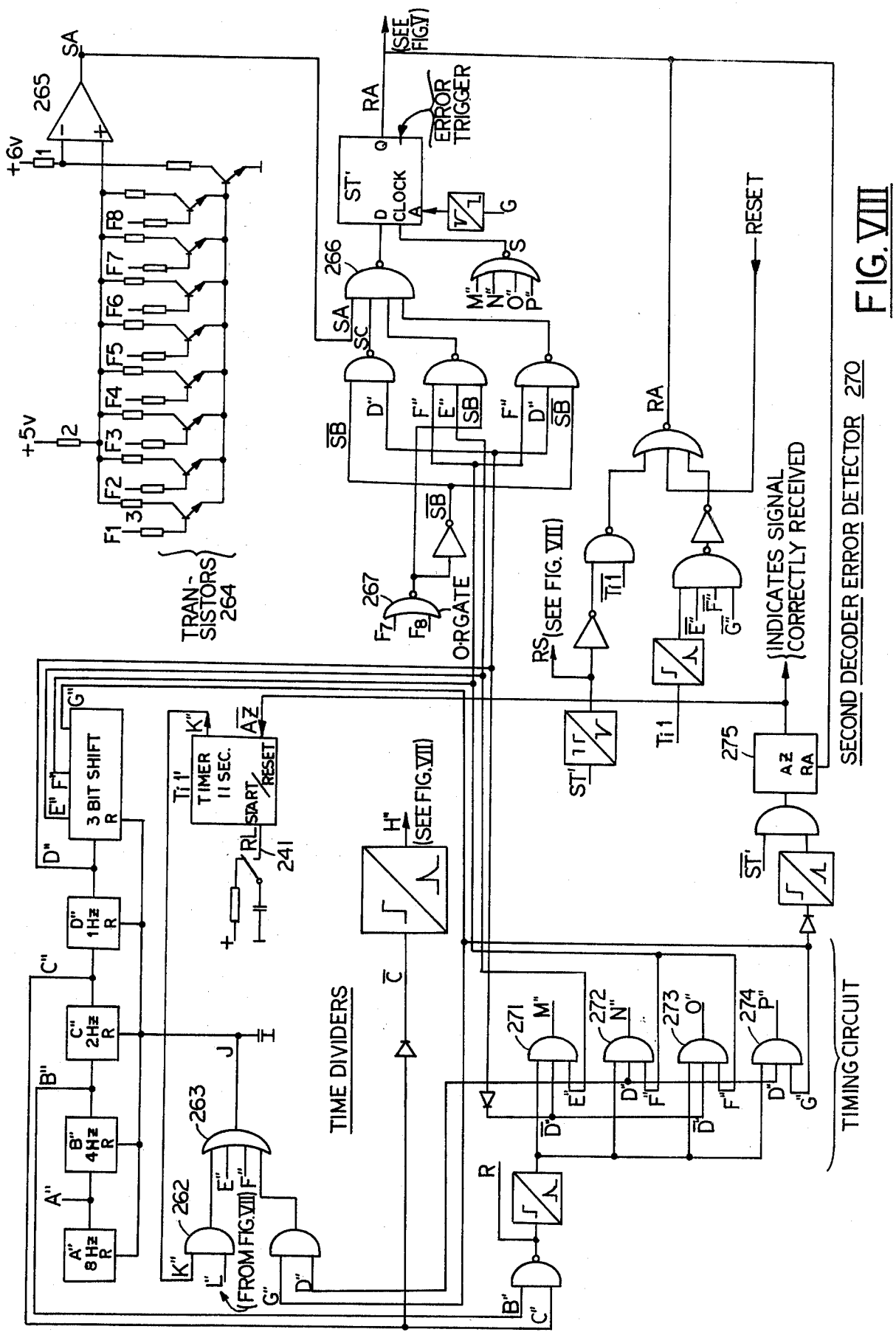
FIG. VIII

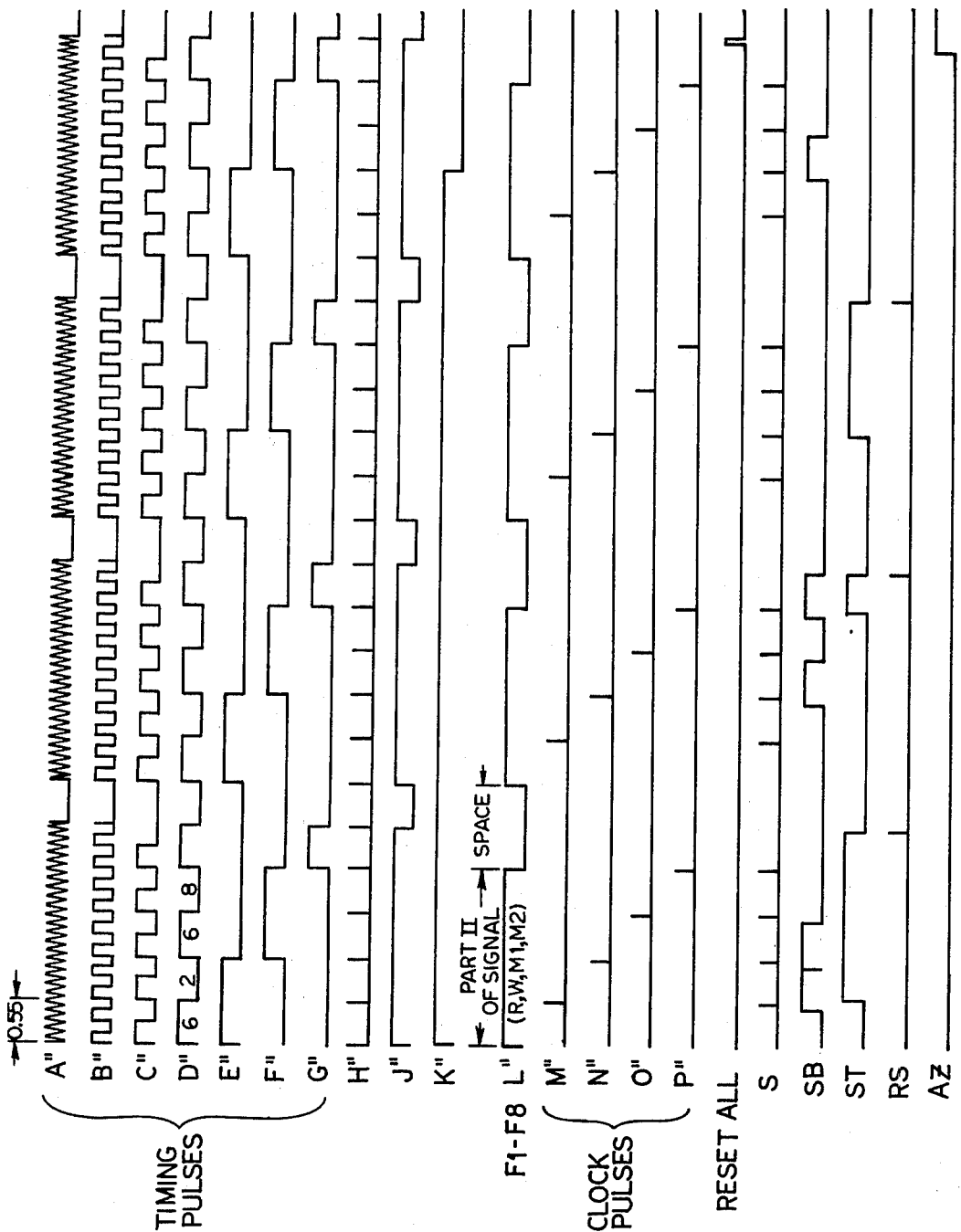

DEVICE FOR CALLING A GROUND STATION BY AN AIRCRAFT

This application is a continuation-in-part of Ser. No. 502,178, filed Aug. 30, 1974, now abandoned.

BACKGROUND OF THE INVENTION

Previously, pilots selected one of a number of predetermined carrier frequencies for calling a ground station which selection depended upon the distance, time and the season of the year. Thus in order for a ground station to be alert to all such calls, the receivers had to be monitored by personnel for all of the frequencies which the pilot might use. This had numerous drawbacks, namely (1) a number of people working in shifts had to be available, (2) a call occuring during traffic for the same ground station may not easily be received, (3) considerable concentration is demanded of the operating personal because they have to listen intensively for a number of hours for possible calls at all available frequencies in the noise of a full band width of receivers, and (4) the operating personnel has to pass calls on to other departments because they cannot undertake any action themselves.

SUMMARY OF THE INVENTION

The present invention provides a solution to the above problem whereby the pilot of an aircraft desiring to call a particular ground station first encodes a calling code signal for that ground station which is transmitted over one of the carrier frequencies he happed to select at the time. The ground station has a plurality of receivers, one for monitoring each of these carrier frequencies. Each receiver is connected to a decoding device that is responsive only to correctly received code signals for that particular station, before automatically connecting that receiver with the desired calledparty for further traffic communication.

The two part calling code signal comprises a first station-calling part composed of pairs of repeated tones of predetermined duration and spacing so that any errors or incompleteness can readily be detected in the decoding device at the ground station. There are provided, say for example, eight different tones in which any two tones may be used in combination for calling any one of 56 different ground stations.

The second or imformation part of this code signal may comprise repeated equally spaced groups of four tones in which the first tone is selected from four or six of the eight different tones for indicating the direction of the aircraft with respect to the called station. The second tone is selected from the two other of the eight different tones for indicating the modulation mode or way of signalling. The third and fourth tones are selected respectively from the first six and all eight of the eight different tones to produce 42 different parts of tones up to 42 different parties which may be connected to that station. No two adjacent tones in either part of the code signal can be alike.

Thus the pilot in the aircraft desiring to call a particular party connected at a particular ground station and being in a specific direction away from that ground station, can select the carrier frequency and activate an encoder on the aircraft to generate both parts of the calling code signal made up of these eight different tones, which code signal is automatically transmitted for setting up the desired traffic communication connection. In order to insure complete and correct reception of this code signal, its first part is repeated three times and then its second part is repeated three times, both automatically by the transmitter in the aircraft.

At the ground station there are provided separate pairs of continuously energized receivers, one for each of the two carrier modes, that is single side band and amplitude modulated signals, tuned to and monitoring each of the, say six, different carrier frequencies which are available and over which the aircraft can transmit traffic. These receivers are provided with directional antenna that are continuously switched for monitoring all directions.

Connected to each receiver are error detecting, decoding, and switching devices. First, at least one of the three repeated two-tone frequencies for that station are detected, and then if the detected pair of tones have sufficient duration and spacing, similarly each of the four tones of the second or information part of the calling signal are detected, and their duration and spacing are also checked. Thus the correct reception of one of the three pairs of tones of the first part of the signal is required before the second part of the signal can be detected, and it is not unit one of the three repeated four tones of the second part of the signal is properly and correctly received that the detected second part is decoded. This decoding of the second part of the signal indicates the three different types of information transmitted thereby, namely the direction from which the aircraft is transmitting, the calling signal, 2) the mode over which traffic is to be transmitted, and 3) the call number of the particular party desired at the station.

This decoding comprises converting the four different tones of the second part of the signal into binary signals which are used for energization, connection, control, and operation of the apparatus corresponding to each of the above three types of information. Thus the switching of the receiving antenna is stopped at the direction corresponding to the direction of the aircraft, as well as the pointing of the transmitting antenna at the aircraft for traffic back to it. The transmitter having the same carrier frequency and the requested mode of transmission is selected and connected. And thirdly, the address of the station being called in then directly connected to both the fixed directional receiver and the selected and directed transmitter, and this connection continues until the called station indicates that the communication has been completed.

If any part of the calling code signal is mutilated or not completely received, there is no completion of a traffic connection nor is there an indication thereof, and as a result the aircraft must again repeat both parts of the calling code signal by first repeating the first part three times and then repeating the second part three times.

In the event that there is more than one call to this particular station by different aircraft over the same carrier frequency, no indication of traffic will be given and another carrier frequency will then have to be selected by the operators in the aircrafts.

In the case there are calls from two different aircraft for the same party at the same station, which calls are received on different frequency carriers, the first one received thus has its connection built-up as described above, whereas the second call cannot have its connection built up as long as the communication continues with the first calling aircraft. In such a case, the second call can be stored until its connection can be made, or its call may be lead to another party, or a break-in facility may be employed to inform the first communicating parties that another party is waiting. All of these latter conditions are accomplished similarly to what is well known in the technique of telephony.

OBJECTS AND ADVANTAGES

Accordingly, it is an object of this invention to produce a telecommunication system between an aircraft and a ground station which reduces the amount of personnel required for monitoring aircrafts frequencies at the ground station, eliminates the effects caused by interfering signals, reacts only if a call is really intended for a ground station, and works in a very narrow band width consequently improving the signal to noise ratio so that the particular code signal will be more easily recognized.

BRIEF DESCRIPTION OF VIEWS

The above-mentioned and other features, objects, and advantages, and the manner of obtaining them are described more specifically below by reference to an embodiment of this invention shown in the accompanying drawings, wherein:

FIG. I is a schematic time sequence diagram of a preferred embodiment of a two part calling code signal that is encoded in an aircraft and decoded in a ground station according to preferred embodiment of this invention;

FIG. II is a schematic block diagram of an aircraft transmitter-receiver with the signal encoder for producing the calling code signals shown in FIG. I.

FIG. III is a time diagram of the pulses generated by the circuit shown in FIG. II for producing the signals shown in FIG. I;

FIG. IV is a schematic block diagram of a ground station for receiving and decoding the code signal shown in FIG. I that is generated and transmitted from the aircraft in the circuit shown in FIG. II;

FIG. V is a schematic block wiring diagram of that part of the decoding and switching apparatus shown in FIG. IV directed to the correct detection of the station calling or first part of the signal shown in FIG. 1.

FIG. VI is a time diagram of the operation of the circuits shown in FIG. V;

FIG. VII is a more detailed schematic block wiring diagram of the detecting part of the decoding and switching apparatus shown in FIG. IV for the second or information part of the signal shown in FIG. 1; including also the code converter and triggers for controlling the switching apparatus and transmitting station;

FIG. VIII is a more detailed schematic wiring diagram of the time dividing circuit for detecting correct and complete tones according to the second or information part of the signal transmitted in FIG. I; and FIG. IX is a time diagram of the pulses according to the circuit in FIG. VIII.

DETAILED DESCRIPTION OF PREFERRED EMBODIMENTS

I Calling Code Signal

For the purposes of illustration of this invention, there is shown in FIG. I an embodiment of a time sequence diagram of a two-part calling code signal, although only the first part thereof may be used, if desired, and still result in the above-mentioned objects and advantages of this invention.

Referring first to the first part of this code signal shown at the left in FIG. I, there are three pairs of tone signals S1, S2, each of which continues for a period of substantially one second, which pairs are spaced by a period of one second. Each pair comprises two different tone frequencies, which may be selected from any one of eight predetermined tone frequencies, such as for example 660, 900, 1140, 1380, 1620, 1860, 2100, and 2340 Hz. (see also the tone generators 21 shown for these frequencies in the aircraft encoder circuit 20 in FIG. II). Thus when a particular combination of these frequencies are selected by the pilot of the aircraft, which combination corresponds to calling code number or address of a particular ground station he wishes to call, this calling code number is automatically transmitted from the aircraft. Correspondingly, the particular called ground station has circuits in its decoder which only will respond to those particular tone frequencies of its call signal, regardless of what carrier may be transmitted over, since all the carriers have receivers at that end at each ground station.

The variation of the one-second-time duration for each tone, and space between each pair of tones S1 and S2, is preferably kept within plus or minus 50 milliseconds, with the detector at the ground station decoder also permitting this variation.

Referring now to the second or imformation part of the calling code signal shown in FIG. I, herein it is shown to comprise three spaced groups of four tones or a quadruplet of tone frequencies, R, W, and M1, M2, each of a half-second duration, no adjacent two of which tones are the same. Each quadruplet of tones is spaced by one second. The first tone R of the quadruplet of tones indicates the direction between the aircraft and the ground station and requires at least four and maybe six different tone frequencies. Thus there remain at least two different tone frequencies for the second tone W which indicates the scheme of modulation, that is, amplitude (A-M) or single side band (S.S.B.) and its tone frequency must be different from the frequencies used for R and for M1 tones. The third and fourth tones M1 and M2 give the information calling number or address of the company or party for which the call is intended. With the remaining combination of tones, forty-two different pairs of tones are available.

The tone signals in the first and second parts of the calling code signal in FIG. I are repeated at definite space intervals, such as three times, in order for the ground station being called to have sufficient time to receive a complete calling code signal.

Between each of the different frequencies of a half second duration in the calling code signal, there is a tolerance of plus or minus 25 milliseconds with intervals from 0 to 5 milliseconds between each of the different frequencies in the quadruplet group of tones. The detector at the ground station decoder has a tolerance so as to permit this same variation also.

In order that the code signals can be processed within a tolerance of plus or minus 50 Hz, such as in the case of single side band transmission, the transmitting apparatus on board the aircraft must have a frequency stability of at least about $10^{-6}$ Hz. The division of the frequency deviations is as follows: (a) till plus or minus 20 Hz. for the transmitting apparatus on board the aircraft, (b) till plus or minus 20 Hz. for the doppler shaft, and (c) till plus or minus 10 Hz. for the receiving apparatus on the ground station, comprising a total deviation of plus or minus 50 Hz. The above deviations occur when utilizing frequencies of more than 20 MHz.

II Aircraft Circuit

Referring now to FIGS. II and III, there is shown a high frequency radio transmitter and receiver 10 having an antenna 11 and traffic signal input and output conductors 12 and 13, respectively. The transmitter-receiving equipment 10 being suitable for either amplitude modulation, or single side band, or both, usually has a maximum transmitting power of about 400 Watts (peak envelope power). Connected to this transmitter-receiver 10 is a well-known carrier frequency-synthesizer 14 capable of producing frequencies of and from generators 4MHz, 6MHz, 8MHz, 13MHz, 17MHz, and 22MHZ, selected singularly and manually by one of the switches 15. Although this carrier frequency may be preset for this particular aircraft, the pilot has the choice of selecting another frequency in the event the same carrier frequency is being used or is occupied by another aircraft in the area calling the same station.

Also connected to this transmission-receiver 10 is a calling code signal encoder 20 comprising a plurality of tone generators 21, such as for eight different tones t-1 through t-8 which for example may comprise the following tone frequencies, respectively: 660 Hz, 900 Hz, 1140 Hz, 1380 Hz, 1620 Hz, 1860 Hz, 2100 Hz and 2340 Hz. This encoder circuit 20 also comprises a timing circuit 30 including a logic circuit for producing the timing pulses for the durations and spacings of each of the selected tones t-1 through t-8. These pulses are shown on FIGS. I and III.

The encoder circuit 20 also includes a matrix 40 of a plurality of multiposition manual selector switches 43 through 48 for controlling the selection of the different tone frequencies t-1 through t-8, which make up the two parts of the calling code signals shown in FIG. I. These selector switches 43 through 48 may be automatically preset when the pilot or operator of the transmitter in the aircraft presses the talk button to set-up a communication, in that for a particular aircraft there often is a particular company or calling station with which the pilot usually wishes to communicate, and the mode of transmission has usually already been built-in to the aircraft transmitter. However, the direction of the aircraft and the particular station being called, although on regular routes may be preset, these can easily be selected manually by the radio operator or pilot of the aircraft. These manual selector switches 43 through 48 have contacts along horizontal lines of the matrix 40 which correspond respectively to the tone signals S1, S2, R, W, M1 and M2. Then the switches 43 through 48 are connectable to the vertical lines of the matrix 40 which are connected to the different tone relays A through H, which operate switches a through h for connecting the eight different tone frequencies t-8 through t-1 respectively to the transmitter 10 via switch 16 controlled by relay Re.

The relay Re and the tone relays A through H are sequentially and time controlled by timing circuit 30 after the selector switches 43 through 48 have been set to connect the desired tones for the calling and information parts of the calling signal shown in FIG. I and FIG. III. This means that tones S1 and S2 for the calling part of the signal are repeated three times as seen by wave form cc3 in FIG. III, and then tones R, W, and M1, M2 for the information part are repeated three times. The control for the sequence and duration of these tones is by AND-gates 53 through 58 in accordance with the pulses generated and illustrated the time diagram of FIG. III. Thus the station calling or first part of the signal shown in FIG. I comprising signal tones S1 and S2, have selector switches 43 and 44 each of which may select any one of the eight frequencies t-1 through t-8 in accordance with the contacts shown along their correspondingly horizontal output conductors or lines from the AND-gates 53 and 54 in FIG. II. The four tones of the second or information part of the signal comprises first the direction indicating tone R, which is herein selected by switch 45 from only six different tones t-3 through t-8 as shown along the output conductor from the AND-gate 55. Then the mode tone W is selected from the two other tones t-1 and t-2 connected by switch 46 to the output conductor from the AND-gate 56. Lastly, the two tones for address of the party being called, there are contacts selected by switch 47 along the output conductor from AND-gate 57 to the six different tones t-3 through t-8 for the tone M1, and contacts selected by switch 48 along the output conductor from AND-gate 58 to all eight tones for tone M2. Thus the selection of these contacts of switches 43 through 48 insures that adjacent tones will not be the same. The insurance that S1 and S2 or M1 and M2 will not be the same tone, can be accomplished by a mechanical or an electrical interconnection between the manual switches 43–44 and 47–48.

Referring now to the timing and logic circuit 30 of this calling code signal encoder circuit 20, there is shown a clock pulse generator CA which generates pulses of a half-second duration as shown along the second horizontal line ca in the time diagram of FIG. III. These pulses are then divided by two in the circuit CB to produce the pulses in the next line cb in time diagram of FIG. III. These pulses are then passed through shift register of triggers CC and CD to produce the pulses in lines cc1, cc2, cc3, cd1, cd2, and cd3 also shown in the time diagram of FIG. III. At the output of the shift register CC-CD a further divider CE produces the pulse ce. Several of these pulses are inverted in inverters before being passed through the AND-gate 50 for the proper timing of the tones of the combined calling signal from the aircraft.

There is also shown a start circuit comprising an eleven second trigger S11 and starting trigger ST which are tied in with the operation of the pulses from the timing circuit 30 so that the transmission of tones will only be in accordance with times shown at the top of FIG. III and in FIG. I.

Once the proper push buttons or switches are set up by the pilot or operator in the aircraft of the address or call number of the station he wishes to call, the mode of his transmission, and his sector or location with respect to that station, all of the rest in transmission of this circuit in FIG. II is done automatically when the talk button on start switch 60 is pressed for the starting of the traffic communication. Of course, he cannot transmit traffic until he receives back a signal from the ground station that his calling signal has been accurately received. Accordingly, after 12 to 15 seconds, if the connection between the aircraft and the ground station has not been set-up, the aircraft must repeat the calling signal, preferably upon another carrier frequency, until the communication connection has been set-up.

III Ground Station Circuit

Referring now to the block circuit diagram in FIG. IV, there is shown one of the many ground stations each of which has a pair of receivers for each of the six different carrier frequencies 4MHz, 6MHz, 8MHz, 13MHz, 17MHz and 22MHz which can be selected by the aircraft pilot; the receivers 101, 103, 105, 107 109 and 111 being, say for example, tuned for amplitude modulation reception, and the other receivers 102, 104, 106, 108, 110 and 112 being tuned, such as for example, for single side band reception, respectively.

Herein the first four receivers 101 through 104 are shown connected to an omni-directional antenna 113, while each of the other four pairs of receivers 105 through 112 are connected to perpendicular dipole antenna 114-115, 116-117, 118-119, and 120-121, respectively. These perpendicular dipole antennas or aerials 114 through 121 are alternately switched rapidly and repeatedly by means of switches 122 through 125, respectively, so as to continuously scan or monitor all directions. These specific switches 122-125 are controlled by control devices 126 through 129, and when a call has been received from an aircraft in a given sector over an antenna responsive to the carrier frequency of the signal from that aircraft, the switching of that antenna is then stopped.

For each of the six different carrier frequencies 4 MHz, 6 MHz, 8MHz, 13MHz, 17MHz, and 22MHz, there are provided six separate decoder circuits 201-206, each of which is connected to the pair of receivers for one carrier frequency. Each of these decoders 201-206 will be similar, and although only one is disclosed and described herein, each comprises a first decoder portion 210 for detecting the first part of the calling signal, namely the S1 and S2 signals, which signals are checked in circuit 230 for correctness and completeness, a more detailed circuit of which is shown in FIG. V in combination with the time diagram VI. Each decoder 201 also comprises a second decoder 250 for the second or information part of the calling signal which is shown in more detail in FIG. VII with its error detector portion 270 shown in FIG. VIII in combination with the time diagram therefor shown in FIG. IX. Once one of the three repeated station-calling or first part of the calling signals transmitted by the aircraft is properly received in the first decoder 210, this indication is passed via conductor 241 to the second decoder 250 for the second part of the signal. Then when one of the three repeated second parts of the signal is properly received as determined by the error detector circuit 270 shown in FIG. VIII, the information received is passed to a priority encoder or binary converter 301, also shown in FIG. VII, which converts the received tone signals into binary codes. The binary code for signal R is passed to the triggers AN (see FIG. VII) of the aircraft direction indicator circuit 310, which then control the stopping of the switching antenna receiving the carrier frequency of the calling signal via conductor 311 to the corresponding control device 126 through 129. The binary code for signal W is passed to the trigger AJ of the mode control circuit 320 for setting-up the mode for the return or transmitted signals to the aircraft, and it correspondingly is connected to one of the twelve different transmitters 401–412 corresponding to the two modes for each of the six different carrier frequencies employed in this system. The antennas for each pair of these transmitters are also connected via conductor 312 from the direction indicator 310 to separate directional antenna control devices 426 through 431, such as by a counter and a step motor, for directing the selected carrier frequency transmitting antenna also toward the calling aircraft. Thus, once the proper sector location of the transmitting aircraft is received from the signal R, the antenna at the transmitter for same carrier frequency at the called ground station is directed toward that aircraft making the call.

Lastly, the binary code corresponding to the information address signal M1 and M2 of the called party automatically selects through its triggers MA shown in FIG. VII, one of the up to forty-two different airline company offices or parties 501, 502, 503, etc., to each of which all of the transmitters 401-412 are connected, so that the properly selected transmitting carrier frequency, direction of transmission, and mode of transmission that has been selected and requested will be automatically connected to that called company or party station 501—etc. Once this occurs, a signal is sent back to the aircraft to indicate that the connection is completed and that traffic communication can continue until the party called releases the circuit, this indication via conductor 420 directly connects the selected called party 501+ to the selected receiver and transmitter at the ground station, as well as resets all of the calling signal detecting circuits.

The details of the operation of the first and second decoder circuits 201 and 301 will now be more specifically described in Sections IIIA and IIIB below in combination with FIGS. V and VI; and VII, VIII and IX; respectively.

III - A Ground Station First Decoder

Referring now to FIG. V, there is shown in the upper left-hand corner one of the receivers 101, which is connected to the two filters 211 and 212, for the two station-calling tones S1 and S2 for this particular ground station. These filters 211, 212 are the same for all of the other first decoders 210 in each of the other five decoder circuits 202-206 at this station. The tones responsive to or passing these filters 211 and 212 produce potentials which are amplified in amplifiers 213, then rectified in rectifiers 214, and shaped in shapers 215 to produce the pulse wave forms A' and C' shown in FIG. VI. These wave forms are then connected to the AND-gates 216 and 217, respectively, where they are gauged for their duration by the error detecting portion 230 of the circuit shown in the lower half of FIG. V, before passing through these AND-gates 216 and 217 to further forming circuits to produce the signal passed through conductor 241 to the second decoder 250 indicating that the first part S1 and S2 of the calling signal has been properly received. These signals S1 and S2 to be qualified as correct and complete must not differ more than − 50 Hz to + 50 Hz from their tone values, and their duration may not differ more than − 15 to + 5% from 1000 milliseconds.

The other inputs to the AND-gates 216 and 217 is output Q from the trigger FF1 and the output of these two gates are the inverted wave forms B' and D' respectively as shown in FIG. VI. This output occurs when the triggers FF1, FF2 and FF3 are not in operation. These wave forms B' and D' are simultaneously fed into the integrator 222 and two differentiators 224 and 225. The integrator 222 feeds a Schmitt trigger 223 to form the sawtooth type wave form F' shown in FIG. VI which takes about 850 milliseconds to build up its sloping potential. Differentiator 224 is connected to an 850 millisecond timer Ti1 to produce the wave form G' shown in FIG. VI which is then formed in circuit 226 to produce the pulses H' shown in time diagram FIG. VI. Then pulses H' together with the sawtooth wave F' and formed pulses M' from waves A' and C' are connected to the input of the AND-gate 227. The output of this AND-gate 227 operates the 250 millisecond timer Ti2 to produce the pulses I' (see FIG. VI) which together with the pulses J' from the second differentiator 225 are connected to the input of AND-gate 228 to operate the 50 millisecond timer Ti3 to produce the pulses K' which are connected through the AND-gate 229 with pulses L' shaped from wave form C' to operate the trigger FF1. The other output Q from the trigger FF1 is to the clock trigger FF2, which is initiated by pulses K' from the timer Ti3 through differentiating circuit 231.

Thus about 750 milliseconds after the beginning of the signal S1, the Schmitt trigger 223 switches and the timer Ti1 operates to produce the pulse G' and then the pulses H', then the timer Ti2 starts because the signal M is "1". This produces the longer pulses I' of b 250 milliseconds duration (see FIG. VI). Now, if the signal S2 starts within the next 50 milliseconds, this signal S2 operates through its corresponding waveform C', the trigger FF1 through the forming of pulse L' during the pulse K' formed from pulses I' and J' and timer Ti3, as inputs to the gate 229 for operating this trigger FF1. The consequence of this is that the gate 217 is opened for the signal S2, which is then tested in the same manner described for the signal S1. However, when the timer Ti3 starts, trigger FF2 switches on, which then resets the trigger FF1. If the second combination of the signals S1 and S2 is received in good order, the trigger FF3 then switches at the end of the second signal S2, so that the relay RL1 will operate, which then operates one of its switches shown in the lower left-hand corner of the circuit of FIG. V which connects the conductor 241 in FIG. IV as previously described to the second decoder 250.

At the same time that the trigger FF2 has been switched, the seven second timer Ti4 is started, which will later be reset by the trigger FF3. If within these seven seconds no second signal combination of S1 and S2 will be received in good order, then the timer Ti4 resets all the triggers. This time of seven seconds has been chosen to be sure that at least one of the three combinations of signals S1 and S2 can be recieved.

Thus far, the first part of the calling signal of S1 and S2 has been tested to see that the frequency of these tone signals S1 and S2 are proper and within the right range, that the duration of these signals by means of the integrator and timers Ti1, Ti2 and Ti3 are proper, and thirdly that the reception of the combination of signals S1 and S2 are properly spaced. In order to avoid that two frequencies will be received at the same time and will be tested as being correct, two resistance-condenser circuits RC are connected to the AND-gate 232 for the "1" potential M'. Thus the potential M' will reset triggers FF2 and FF3 and avoid switching of the signal to the timer Ti2 in the event that both S1 and S2 are simultaneously received.

III - B Ground Station Second Decoder

Referring now to FIG. VII, VIII and IX, and first of all FIG. VII, each of the receivers 101 through 112 is connected to the filters f1 through f8 for the eight different tones of the second or intelligence part of the calling signal for their proper detection. The outputs of each of these filters f1 - f8 are passed through amplifiers 251, rectifiers 252, shapers 253, integrators 254, and Schmitt triggers 255 to operate triggers T1 through T8 respectively. These triggers T1 - T8 correspondingly are connected to the binary encoder 301, also shown in FIG. IV, which encodes the particular frequencies received into binary code signals for operating the triggers AN, AJ and MA which are shown in the control circuits 310, 320 and 501+, respectively. The outputs of each of the shapers 253 from each filter f1 - f8 are connected via rectifiers 261 to produce the wave form L" shown in the middle of time diagram FIG. IX, the long positive pulses of which indicate the time during which the four signals R, W, M1 and M2 are received, and the zero or negative parts of which are of the one-second spacing between each one of these four signals as it is repeated three times to insure correct detection.

The triggers AN1, AN2 and AN3 in FIG. VII correspond to the R portion of the information signal part for determining the direction or sector location of the aircraft, and thus control the remote control devices 126 - 129 and 426 - 431 as described above. The trigger AJ indicating the modulation mode operates the mode control circuit 320 for selecting which one of the pairs of transmitters 401 - 412 are to be chosen for transmission from the ground station. The triggers MA1 through MA6, six triggers for each party, subscriber or airline company 501+, respond to the address or call number corresponding to the tones M1 and M2 to select and connect the party station being called by the aircraft. Thus triggers MA also connect that selected airline company or party through conductor 420 (see FIG. IV) to the specific receiver at the ground station that received the calling signal, by-passing the decoders herein previously described, for direct connection for the traffic to be communicated between the aircraft and that party called.

The error detection for the second or information part of the calling signal, namely R, W, and M1, M2, is disclosed in more detail in the circuits of FIG. VIII wherein the wave form L" from FIG. VII is one of the inputs to the AND-gate 262, while its other input is the potential of wave form K" from the output of the eleven second timer Ti1' which is started by the RL potential indicating correct reception of the first part of the calling signal via connection 241 (FIG. V). This eleven second timer Ti1' produces the long potential K" (see FIG. IX) so that any one of the three repetitions of the four or quadruplet tones of the information part can be received. The output of AND-gate 262 through OR-gate 263 starts the time dividers of the 8 Hz circuits A", 4 Hz circuit B", 2 Hz circuit C", 1 Hz circuit D", and shift register having outputs E", F", and G", each producing correspondingly identified wave forms shown in FIG. IX. It is these wave forms or timing pulses which are connected to the other parts of the circuit in FIG. VIII that are used for checking the timing and duration of the tones reception. The different pulses M", N", O" and P" correspnding to each of these four different tones as shown from the AND-gates 271, 272, 273 and 274, respectively, and similarly indicated pulses in time diagram shown in FIG. IX.

As previously stated, the first frequency or tone R must not be tones t1 or t2 and the second tone W must be tones t1 or t2, the third tone M1 must not be tones t1 or t2, and the fourth tone M2 can be one of the tones t1 through t8, but different from the tone of M1. Thus in each of the parts R, W, M1 and M2 in FIG. 1, only one frequency may be received. This is detected in the circuit shown in the upper right-hand corner of FIG. VIII to which each of the pulses in conductors F1 through F8 from triggers T1 through T8 shown in the center of FIG. VII are connected at the correspondingly identified terminals of eight separate transistors 264, the bases of all of which are connected to an amplifier 265 to produce an output SA that is connected to an AND-gate 266 for operating the error trigger ST'. The output SA of the amplifier 265 is low if there are no or more than one input to these transistors 264, and the output SA is high if there is only one input to these transistors 264. Thus these transistors 264 insure that for each particular information signal part, only one frequency is detected at a time.

Next, this information signal part must be tested to see if its tones are the proper ones. This is done by means of the OR-gate 267 which is fed only by the pulses in conductors F7 and F8 to produce output potentials or pulses SB (see also FIG. IX) corresponding to the four portions R, W, M1 and M2 of the information signal part. Thus for a correctly received signal the pulses or potential of SB should be low during the time for R, high during the time for W, and low during the time for M1, and may be either high or low during the time for M2. Under these conditions, the trigger ST' would not be operated. If other than this occurs, then the trigger ST' is operated and an error is indicated, so that the output of the trigger ST' will then produce an output pulse RA that will even prevent the operation of the first decoder circuit 210 as shown at the input into the lower right-hand corner of FIG. V.

It should be understood that if the first of the three repeated combination of tones is in error, the next combination is tested, and it is not until all three combinations of tones have been tested to be erroneous that a final error signal RA will be given and the eleven second timer Ti1' has expired so that the calling signal from the aircraft can and must be repeated.

On the other hand, when both parts of a calling signal are correctly received a pulse AZ is generated in the trigger 275 shown in the lower center of FIG. VIII. This pulse AZ is used to reset all of the timers and triggers of the detector and encoder circuits. Furthermore, when the called party finishes with the traffic communication with the aircraft, a signal is generated for resetting the whole system, and the ground station's receiver's antenna is again switched for receipt of its carrier frequency from another aircraft.

While there is described above the principles of this invention in connection with specific apparatus, it is to be clearly understood that this description is made only by way of example and not as a limitation to the scope of this invention.

We claim:

1. A ground station system for automatically monitoring radio communication calls from aircraft which transmit and receive traffic over one of a predetermined number of high frequency carriers, comprising:
   I. in said aircraft:
      A. means for transmitting from said aircraft a calling code signal of tone frequencies of given spacing and duration indicating in its code the ground station to be called, and
   II. at said ground station:
      A. separate receivers tuned to all of said high frequency carriers,
      b. decoding means connected to all of said receivers for completely and correctly receiving the calling code signal for said ground station over any one of said carriers, and
      C. means for transmitting traffic signals over said one high frequency carrier upon which said calling code signal was detected by said decoding means.

2. A device according to claim 1 wherein said calling code signal comprises repeated pairs of tone frequencies of predetermined duration and spacing.

3. A device according to claim 1 wherein said receivers are connected to directional antennas.

4. A device according to claim 3 including means for switching between said directional antennas.

5. A device according to claim 4 wherein said code signal comprises an information part indicating the direction of said aircraft with respect to said ground station.

6. A device according to claim 1 wherein said aircraft and said ground stations include traffic receivers and traffic transmitters.

7. A device according to claim 6 wherein said ground station transmitter includes an antenna suitable to be directed towards said aircraft.

8. A system according to claim 1 wherein said code signal also indicates the direction sector of said aircraft with respect to said ground station and said decoding means responds to said direction and controls means for directing the antenna of said transmitting means at said ground station toward said aircraft.

9. A system according to claim 1 wherein said code signal also indicates the modulation scheme for said traffic and said decoding means detects said scheme and correspondingly control said transmitter means at said ground station.

10. A system according to claim 1 wherein said code signal includes means for indicating the party being called at said ground station, and said decoding means detects said indication and automatically connects said receiver of said code signal and said transmitter means to said party for traffic signals.

11. A system according to said claim 1 wherein said duration and spacing between said tone frequencies in said code signal is from about one-half to one second.

12. A ground station system for automatically monitoring radio communication calls from aircraft which transmit and receive traffic over one of a predetermined number of high frequency carriers, comprising:
   I. in said aircraft:
      A. means for transmitting from said aircraft a calling code signal of tone frequencies of given spacing and duration indicating in its code;
         1. a ground station to be called,
         2. the direction sector of said aircraft with respect to said ground station,
         3. the modulation scheme, and
         4. the party being called at said ground station; and
   II. at said ground station:
      A. separate receivers for each of said high frequency carriers,
      B. decoding means connected to all of said receivers for detecting a complete and correctly received calling code signal from said aircraft over any one of said carriers,
      C. a transmitter for transmitting traffic from said ground station to said aircraft, and D. means for selecting a transmitter for said one carrier frequency and switching the transmitter antenna towards the direction of said aircraft.

13. A ground station method for automatically monitoring radio communication calls from aircraft which transmit and receive traffic over one of a predetermined number of high frequency carriers, comprising the steps of:

I. in said aircraft:
   A. generating a calling code signal comprising:
      1. a ground station calling part of a repeated spaced pair of predetermined tone frequencies, each of the same duration,
      2. an information part of a repeated spaced quadruplet of predetermined tone frequencies, each of the same and another given duration, indicating:
         a. the direction sector of said aircraft with respect to the called ground station,
         b. the modulation scheme, and
         c. the party being called,
   B. modulating and transmitting said code signal on one of said high frequency carriers, and
   C. transmitting and receiving traffic from said called ground station on said one carrier after calling code signal has been correctly received by said party; and II. at said ground station:
   A. separately monitoring each of said high frequency carriers for amplitude and single side band reception, omni-directionally or directionally,
   B. detecting the tone frequencies of said calling code signal on any one of said carriers,
   C. determining the duration and spacing of said tones in said calling code signal for indicating the complete and correct reception of said calling code signal,
   D. responding to the correctly received calling part of said calling code signal for said selected ground station,
   E. decoding said information part of said calling code signal for determining:
      1. the direction sector of said aircraft from said selected ground station,
      2. the modulation scheme, and
      3. the party being called,
   F. selecting the ground station traffic transmitter for the carrier of said code signal,
   G. switching the traffic transmitting and receiving ground station antennas towards the direction of said aircraft in response to said determined direction from one part of said information part of said code signal,
   H. setting said ground station traffic transmitter and receiver to operate according to said scheme determined from another part of said information part of said code signal, and
   I. connecting said ground station traffic transmitter and receiver to the called party determined by a third part of said information part of said code signal.

* * * * *

UNITED STATES PATENT OFFICE
CERTIFICATE OF CORRECTION

Patent No. 4,056,781            Dated November 1, 1977

Inventor(s) Albert Hetebrij et al

It is certified that error appears in the above-identified patent and that said Letters Patent are hereby corrected as shown below:

Column 1, line 56, change "parts" to - - pairs - -. Column 2, line 23, change "unit" to - - until - -. Column 3, line 10, change "aircrafts" to - - aircraft - -. Column 4, line 19, after "carrier" insert - - they - -; line 49, change "space" to - - spaced - -; line 66, change "shaft" to - - shift - -. Column 6, line 2, after "illustrated" insert - - in - -; line 43, change "gate" to - - gates - -. Column 7, line 17, change "antenna" to - - antennas - -. Column 9, line 22, cancel "b".

Signed and Sealed this

Seventh Day of March 1978

[SEAL]

Attest:

RUTH C. MASON
Attesting Officer

LUTRELLE F. PARKER
Acting Commissioner of Patents and Trademarks